US006980255B2

(12) United States Patent
Hauge et al.

(10) Patent No.: US 6,980,255 B2
(45) Date of Patent: Dec. 27, 2005

(54) VSB MODULATOR SYMBOL CLOCK PROCESSING TO REDUCE JITTER/PHASE NOISE AND SAMPLING ARTIFACTS

(75) Inventors: Raymond C. Hauge, Fox River Grove, IL (US); Gary A. Jones, Hawthorn Woods, IL (US); Philip J. Nowaczyk, Chicago, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 597 days.

(21) Appl. No.: 10/279,319

(22) Filed: Oct. 24, 2002

(65) Prior Publication Data

US 2003/0151692 A1 Aug. 14, 2003

Related U.S. Application Data

(60) Provisional application No. 60/356,299, filed on Feb. 13, 2002.

(51) Int. Cl.[7] .............................. H04N 7/00; H04L 7/00
(52) U.S. Cl. ...................... 348/497; 348/536; 375/226; 375/371
(58) Field of Search ................................ 348/723–726, 348/180, 192, 470, 501, 521, 536, 497; 375/211, 375/226, 296, 355, 357, 362, 371, 373, 375, 375/376; 370/503, 516

(56) References Cited

U.S. PATENT DOCUMENTS

| | | | | |
|---|---|---|---|---|
| 4,472,817 A * | 9/1984 | Poklemba et al. | .......... | 375/344 |
| 4,985,900 A * | 1/1991 | Rhind et al. | ................ | 375/226 |
| 5,438,590 A * | 8/1995 | Tzukerman et al. | ........ | 375/259 |
| 5,825,778 A | 10/1998 | Hauge | | |
| 6,426,972 B1 * | 7/2002 | Endres et al. | ............... | 375/229 |
| 6,563,862 B1 * | 5/2003 | Knutson et al. | ............ | 375/219 |
| 2005/0018798 A1 * | 1/2005 | Li | .............................. | 375/355 |

* cited by examiner

*Primary Examiner*—Victor R. Kostak

(57) ABSTRACT

A translator demodulates a received digital television signal so as to produce a digital data stream, a symbol clock, and a byte clock, wherein the symbol clock and the byte clock are corrupted by phase noise. The digital data stream is written into a buffer in response to the corrupted byte clock. The corrupted symbol clock is applied to a frequency/phase locked loop having a narrowband loop filter. The frequency/phase locked loop produces a regenerated symbol clock having substantially no phase noise. The digital data stream is read from the buffer in response to the regenerated symbol clock. The digital data stream read from the buffer and the regenerated symbol clock are applied to a modulator for re-broadcasting of the received digital television signal.

34 Claims, 1 Drawing Sheet

VSB MODULATOR SYMBOL CLOCK PROCESSING TO REDUCE JITTER/PHASE NOISE AND SAMPLING ARTIFACTS

RELATED APPLICATIONS

The present application claims the benefit of Provisional Application Ser. No. 60/356,299 filed on Feb. 13, 2002.

TECHNICAL FIELD OF THE INVENTION

The present invention relates to translators of RF signals such as VSB digital television signals.

BACKGROUND OF THE INVENTION

In order to provide television service to certain geographical areas that are not directly covered by transmitters associated with networks or other broadcasters, it is customary to provide one or more translators between such transmitters and the receivers located in these geographical areas. Each translator demodulates the signal from the transmitter or from another translator, re-modulates the demodulated signal, and transmits the re-modulated signal for reception by receivers in the affected geographical areas or by other translators.

Accordingly, in the process of supplying a broadcast signal from a transmitter to a receiver, it is possible for the signal to undergo multiple sequences of demodulation, re-modulation, and re-transmission. Because each of these sequences deteriorates the base signal, there is a practical limit on the number of the sequences that can be performed before the signal becomes unusable.

One of the main sources of this deterioration is phase noise (jitter) which is introduced into the signal through the mixing operation during each sequence of demodulation, re-modulation, and re-transmission. As the broadcast signal passes through each translator, phase noise increasingly corrupts the symbol clock as well as the byte clock that is typically derived from the symbol clock. Receivers using corrupted symbol and byte clocks have difficulty in properly decoding the received broadcast signals.

Moreover, new integrated circuits that are being used for demodulation of these broadcast signals often use sampled symbol clocks that contain artifacts that contribute to the deterioration of the signal.

The present invention is directed to the translation of signals in a way that reduces phase noise and/or artifacts in the symbol clock that is used during the demodulation, re-modulation, and re-transmission process.

SUMMARY OF THE INVENTION

According to one aspect of the present invention, a method of translating a received digital television signal comprises the following: demodulating the received digital television signal to produce a digital data stream, a symbol clock, and a byte clock, the symbol clock and the byte clock being corrupted by phase noise; writing the digital data stream into a buffer in response to the corrupted byte clock; applying the corrupted symbol clock to a frequency/phase locked loop having a narrowband loop filter to produce a regenerated symbol clock having substantially no phase noise; producing a regenerated byte clock having substantially no phase noise in response to the regenerated symbol clock; reading the digital data stream from the buffer in response to the regenerated symbol clock; and, applying the digital data stream read from the buffer, the regenerated symbol clock, and the regenerated byte clock to a modulator for re-broadcasting the received digital television signal.

According to another aspect of the present invention, a re-transmitter that re-transmits a received digital television signal comprises a demodulator, a buffer, a write controller, a frequency/phase locked loop, a read controller, and a modulator. The demodulator demodulates the received digital television signal to produce a received data stream and a received symbol clock. The write controller writes the received data stream into the buffer. The frequency/phase locked loop has a narrowband loop filter, and regenerates the received symbol clock as a regenerated symbol clock having substantially no phase noise. The read controller reads the data stream from the buffer in response to the regenerated symbol clock. The modulator re-modulates the data stream read from the buffer for re-transmission as a re-transmitted digital television signal.

According to still another aspect of the present invention, a re-transmitter that re-transmits a received digital television signal comprises a demodulator, a frequency/phase locked loop, a buffer, a buffer controller, and a modulator. The demodulator demodulates the received digital television signal to produce a received data stream and a received symbol clock. The frequency/phase locked loop has a narrowband loop filter, and regenerates the received symbol clock as a regenerated symbol clock having substantially no phase noise. The buffer controller writes the received data stream into the buffer, reads the received data stream from the buffer in response to the regenerated symbol clock, and prevents overflow of the buffer. The modulator re-modulates the received data stream read from the buffer for re-transmission as a re-transmitted digital television signal.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
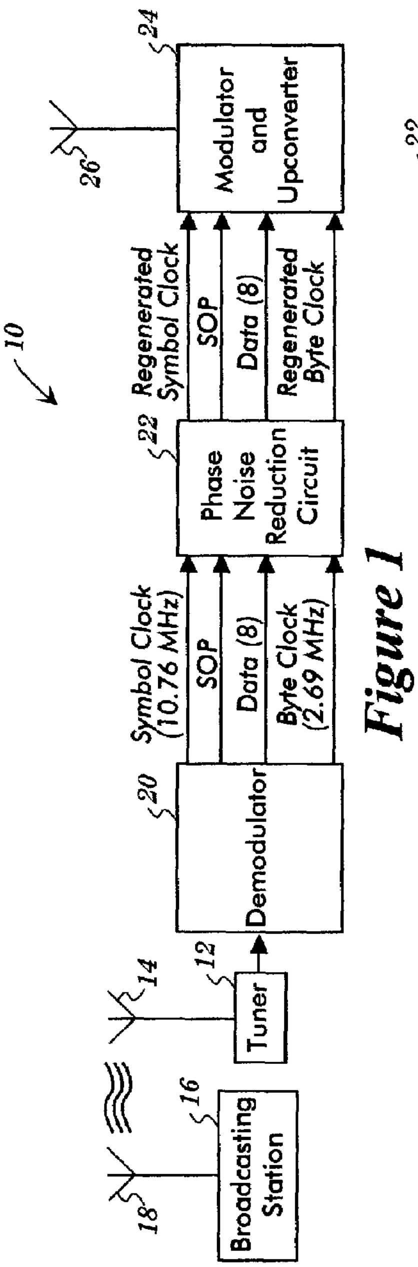
FIG. 1 illustrates a translator according to one embodiment of the present invention; and, FIG. 2 illustrates the phase noise reduction circuit of FIG. 1 in additional detail.

As shown in FIG. 1, a translator 10 includes a tuner 12 that is coupled to a receiving antenna 14. The receiving antenna 14 receives an RF signal from a broadcasting station 16 that transmits the signal by way of a transmitting antenna 18. The tuner 12 tunes to the signal supplied by the broadcasting station 16.

The signal from the tuner 12 is provided to a demodulator 20 that demodulates the signal in order to recover (i) the symbol clock $f_s$ (which in digital television has a frequency on the order of 10.76 MHz), (ii) the start of packet (SOP) signal, (iii) the data contained in the signal, and (iv) the byte clock (which typically has a frequency of $f_s/4$ or about 2.69 MHz for a trellis encoded 8 VSB digital television signal). The symbol clock $f_s$, the start of packet signal, the data, and the byte clock are provided to a phase noise (and/or artifact) reduction circuit 22 in order to reduce the effects of phase noise and/or artifacts on the signal being re-transmitted.

Accordingly, the phase noise reduction circuit 22 provides a regenerated symbol clock $f_s$, the start of packet signal, the data, and a regenerated byte clock to a modulator and upconverter 24 for re-transmission over a re-transmitting antenna 26.

Generally, the phase noise reduction circuit 22 clocks the demodulated data and start of packet signal (comprising, at least in part, a data transport stream) from the demodulator 20 into an elastic buffer and clocks out the data from the buffer using a newly regenerated symbol clock derived from a frequency/phase locked loop. The frequency/phase locked loop includes a low phase noise voltage controlled crystal oscillator that is locked to the average of the incoming symbol clock provided by the demodulator 20. By narrowing the bandwidth of the loop filter in the frequency/phase locked loop, it is possible to remove most of the high frequency components of the phase noise and/or artifacts from the symbol clock and, therefore, to restore significantly the integrity of the received signal so as to increase the possible number of translations.

Figure 2:
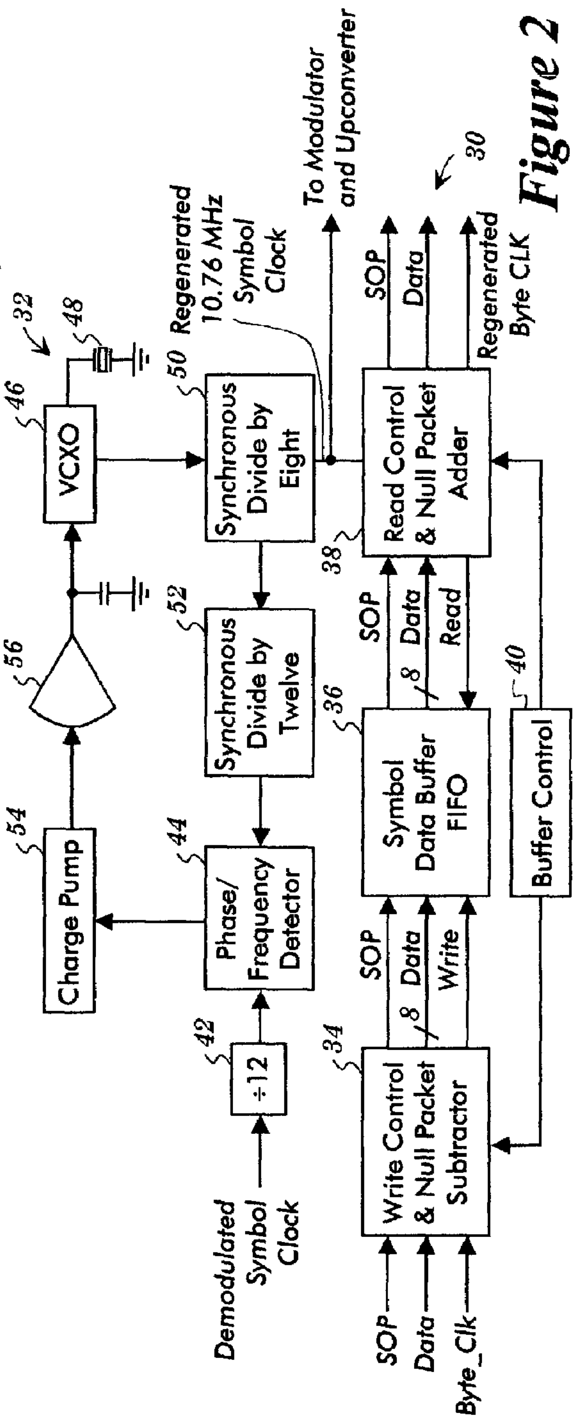

Thus, as shown in FIG. 2, the phase noise reduction circuit 22 generally includes two major blocks, an elastic buffer 30 for the demodulated data and start of packet signal, and a narrow bandwidth frequency/phase locked loop 32 having a voltage controlled crystal oscillator for producing the regenerated symbol clock.

The elastic buffer 30 may take the form shown in detail in U.S. Pat. No. 5,825,778 and, therefore, includes a write control and null packet subtraction circuit 34, a FIFO (first in-first out) buffer 36, a read control and null packet adder circuit 38, and a buffer controller 40. As is known, various input source signals augment their data transport streams with null packets in order to ensure that the input transport stream data rate does not fall below the nominal bit rate (typically 19.39 MHz).

The start of packet signal, the data, and the byte clock signal, which is possibly corrupted with phase noise, are supplied from the demodulator 20 to the write control and null packet subtraction circuit 34. The write control and null packet subtraction circuit 34, under control of the buffer controller 40, removes null packets as necessary to prevent overflow of the FIFO buffer 36, and supplies the demodulated data, the start of packet signal, and a write signal to the FIFO buffer 36. Because null packets are removed, the byte clock signal cannot be used directly to write the demodulated data and start of packet signal into the FIFO buffer 36. Therefore, the write control and null packet subtraction circuit 34 generates the write signal in response to the byte clock signal and the buffer controller 40.

The FIFO buffer 36 stores the start of packet signal for output timing of the data packets and also stores the data in the form of data packets.

The start of packet signal and the data are read out of the FIFO buffer 36 under control of a read signal generated by the read control and null packet adder circuit 38. The read control and null packet adder circuit 38, under control of the buffer controller 40, also replaces the null packets that are removed by the write control and null packet subtraction circuit 34. The read control and null packet adder circuit 38 operates in response to the regenerated symbol clock to provide the start of packet signal, the data, and a regenerated byte clock signal to the modulator and upconverter 24. The read control and null packet adder circuit 38 may generate the regenerated byte clock signal by suitably dividing the regenerated symbol clock. For example, in the case of an 8 VSB system using trellis encoding, the read control and null packet adder circuit 38 may generate the regenerated byte clock signal by dividing the regenerated symbol clock by four.

The buffer controller 40 monitors the fullness of the FIFO buffer 36 and controls the write control and null packet subtraction circuit 34 so as to remove null packets when the FIFO buffer 36 becomes too full and to allow null packets to pass to the FIFO buffer 36 when it is not too full. The buffer controller 40 controls the read control and null packet adder circuit 38 so that, when the data is read out of the FIFO buffer 36, any null packets that were removed are replaced.

Accordingly, the elastic buffer 30 reduces the tolerance requirement on the symbol clock from the normal tight requirements of the ATSC VSB standard to one that is allowed to vary around a nominal average clock frequency, provided that the excursions in clock frequency do not permit the FIFO buffer 36 to overflow. This relaxed clock frequency permits the use of a narrowband loop filter to create a regenerated symbol clock that is the average of the input symbol clock and that is free of excessive phase noise and/or artifacts.

The symbol clock processing and regeneration is a multistage process. The demodulated symbol clock from the demodulator 20 is sampled and, therefore, appears as a train of pulses of non-uniform duration with superimposed jitter. In order to make these pulses more uniform, the demodulated symbol clock is processed through a divide-by-twelve circuit 42. Accordingly, the divide-by-twelve circuit 42 divides the symbol clock by twelve to produce a reference having a frequency of $f_s/12$. The divide-by-twelve circuit 42 may be implemented as a synchronous counter, with a modulus equal to the periodic pattern of the pulse train, followed by two sets of flip-flops. The synchronous counter and flip-flops produce a well behaved square wave reference frequency that is a subharmonic of the input symbol clock frequency and that has reduced jitter.

The reference frequency supplied by the divide-by-twelve circuit 42 is provided to a first input of a digital edge triggered frequency/phase detector 44. A voltage controlled crystal oscillator 46 having very low phase noise is driven by a crystal 48 to produce an output having a frequency that is a multiple (such as eight) of the nominal symbol clock frequency. A frequency divider 50 divides the frequency of the signal provided by the voltage controlled crystal oscillator 46 down to the frequency of the symbol clock. For example, the frequency divider 50 may divide the frequency of the signal provided by the voltage controlled crystal oscillator 46 by eight. Accordingly, the output of the frequency divider 50 is the regenerated symbol clock.

The regenerated symbol clock is supplied to the read control and null packet adder circuit 38 which processes the regenerated symbol clock to read out the data transport stream from the FIFO buffer 36. The regenerated symbol clock is also used as the master clock in the subsequent modulation and upconversion process performed by the modulator and upconverter 24.

Moreover, the regenerated symbol clock is supplied to a divide-by-twelve circuit 52. Accordingly, the divide-by-twelve circuit 52 has a divide ratio that matches the divide ratio of the divide-by-twelve circuit 42. The divide-by-twelve circuit 52 may be implemented as a synchronous counter having a modulus set to match the divide ratio applied to the incoming symbol clock and, therefore, produces a similar subharmonic of the symbol clock.

This subharmonic of the regenerated symbol clock supplied by the divide-by-twelve circuit 52 is fed back to a second input of the digital edge triggered frequency/phase detector 44. The output of the digital edge triggered frequency/phase detector 44 is a phase error between the reference frequency supplied by the divide-by-twelve circuit 42 and the subharmonic of the regenerated symbol clock supplied by the divide-by-twelve circuit 52. This phase error is provided to a charge pump 54. The charge pump 54 outputs a current that is based on the phase error.

The current from the charge pump 54 is provided to an operational amplifier 56 that is configured as a multiple pole low pass filter with a very low cut off frequency. For example, the operational amplifier 56 may be configured to have a bandwidth of about 1–50 Hz. That is, the operational amplifier 56 is arranged to operate at frequencies between 1 and 50 Hz. Preferably, the operational amplifier 56 may be configured to have a bandwidth of about 0–5 Hz. The output of the operational amplifier 56 represents the difference in frequency/phase between the average frequency of the demodulated symbol clock provided by the demodulator 20 and the average frequency of the regenerated symbol clock derived from the voltage controlled crystal oscillator 46. However, the output of the operational amplifier 56 does not have the phase noise (jitter) of the demodulated symbol clock from the demodulator 20.

The output of the operational amplifier 56 is fed into the voltage controlled crystal oscillator 46 which forces the voltage controlled crystal oscillator 46 to lock with the nominal frequency of the symbol clock as required by the elastic buffer 30.

Accordingly, the voltage controlled crystal oscillator 46 and the frequency divider 50 provide a regenerated symbol clock that has lower phase noise and/or artifacts so that more translations of the broadcast signal can be implemented without adversely affecting the integrity of the broadcast signal.

Modifications of the present invention will occur to those practicing in the art of the present invention. For example, as described above, the charge pump 54 is used to output a current dependent on the phase error supplied by the frequency/phase detector 44. Instead, other devices such as amplifiers may be used to couple the phase error from the frequency/phase detector 44 to the operational amplifier 56. Alternatively, the phase error from the frequency/phase detector 44 may be coupled directly to the operational amplifier 56.

Moreover, an elastic buffer is used to store the demodulated data and start of packet signal so that the demodulated data and start of packet signal can be read out using the regenerated symbol clock. Instead, an inelastic buffer may be used.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of translating a received digital television signal comprising:

demodulating the received digital television signal to produce a digital data stream, a symbol clock, and a byte clock, the symbol clock and the byte clock being corrupted by phase noise;

writing the digital data stream into a buffer in response to the corrupted byte clock;

applying the corrupted symbol clock to a frequency/phase locked loop having a narrowband loop filter to produce a regenerated symbol clock having substantially no phase noise;

producing a regenerated byte clock having substantially no phase noise in response to the regenerated symbol clock;

reading the digital data stream from the buffer in response to the regenerated symbol clock; and, applying the digital data stream read from the buffer, the regenerated symbol clock, and the regenerated byte clock to a modulator for re-broadcasting the received digital television signal.

2. The method of claim 1 wherein the applying of the corrupted symbol clock to a frequency/phase locked loop having a narrowband loop filter comprises applying the corrupted symbol clock to a frequency/phase locked loop having a narrowband loop filter defined by a bandwidth of about 1–50 Hz.

3. The method of claim 1 wherein the applying of the corrupted symbol clock to a frequency/phase locked loop having a narrowband loop filter comprises applying the corrupted symbol clock to a frequency/phase locked loop having a narrowband loop filter defined by a bandwidth of about 0–5 Hz.

4. The method of claim 1 wherein the applying of the corrupted symbol clock to a frequency/phase locked loop comprises detecting a phase/frequency error between the corrupted symbol clock and the regenerated symbol clock.

5. The method of claim 4 wherein the phase/frequency error is detected by a phase/frequency detector, and wherein the applying of the corrupted symbol clock to a frequency/phase locked loop comprises:

dividing the corrupted symbol clock;

applying the divided corrupted symbol clock to the phase/frequency detector;

dividing the regenerated symbol clock; and, applying the divided regenerated symbol clock to the phase/frequency detector.

6. The method of claim 5 wherein the applying of the corrupted symbol clock to a frequency/phase locked loop further comprises:

filtering the phase/frequency error in the narrowband loop filter to produce a filter output; and, controlling a voltage controlled oscillator in response to the filter output to produce an oscillator output.

7. The method of claim 6 wherein the applying of the corrupted symbol clock to a frequency/phase locked loop further comprises dividing the oscillator output to produce the regenerated symbol clock.

8. The method of claim 7 wherein the controlling of a voltage controlled oscillator comprises controlling a voltage controlled crystal oscillator.

9. The method of claim 4 wherein the applying of the corrupted symbol clock to a frequency/phase locked loop comprises:

filtering the phase/frequency error in the narrowband loop filter to produce a filter output; and, controlling a voltage controlled oscillator in response to the filter output to produce an oscillator output.

10. The method of claim 9 wherein the applying of the corrupted symbol clock to a frequency/phase locked loop further comprises dividing the oscillator output to produce the regenerated symbol clock.

11. The method of claim 9 wherein the controlling of a voltage controlled oscillator comprises controlling a voltage controlled crystal oscillator.

12. A re-transmitter that re-transmits a received digital television signal comprising:

a demodulator that demodulates the received digital television signal to produce a received data stream and a received symbol clock;

a buffer;

a write controller that writes the received data stream into the buffer;

a frequency/phase locked loop having a narrowband loop filter, wherein the frequency/phase locked loop regenerates the received symbol clock as a regenerated symbol clock having substantially no phase noise;

a read controller that reads the data stream from the buffer in response to the regenerated symbol clock; and, a modulator that re-modulates the data stream read from the buffer for re-transmission as a re-transmitted digital television signal.

13. The re-transmitter of claim 12 wherein the narrowband loop filter has a bandwidth of about 1–50 Hz.

14. The re-transmitter of claim 12 wherein the narrowband loop filter has a bandwidth of about 0–5 Hz.

15. The re-transmitter of claim 12 wherein the frequency/phase locked loop comprises a phase/frequency detector that detects a phase/frequency error between the received symbol clock and the regenerated symbol clock.

16. The re-transmitter of claim 15 wherein the frequency/phase locked loop comprises:

a first divider that divides the received symbol clock and that applies the divided received symbol clock to the phase/frequency detector; and, a second divider that divides the regenerated symbol clock and that applies the divided regenerated symbol clock to the phase/frequency detector.

17. The re-transmitter of claim 16 wherein the frequency/phase locked loop further comprises a voltage controlled oscillator, and wherein the voltage controlled oscillator produces an oscillator output in response to an output from narrowband loop filter.

18. The re-transmitter of claim 17 wherein the frequency/phase locked loop comprises a third divider that divides the oscillator output so as to produce the regenerated symbol clock.

19. The re-transmitter of claim 18 wherein the voltage controlled oscillator comprises a voltage controlled crystal oscillator.

20. The re-transmitter of claim 12 wherein the frequency/phase locked loop comprises a voltage controlled oscillator, and wherein the voltage controlled oscillator produces an oscillator output in response to an output of the narrowband loop filter.

21. The re-transmitter of claim 20 wherein the frequency/phase locked loop comprises a divider that divides the oscillator output to produce the regenerated symbol clock.

22. The re-transmitter of claim 20 wherein the voltage controlled oscillator comprises a voltage controlled crystal oscillator.

23. A re-transmitter that re-transmits a received digital television signal comprising:

a demodulator that demodulates the received digital television signal to produce a received data stream and a received symbol clock;

a frequency/phase locked loop having a narrowband loop filter, wherein the frequency/phase locked loop regenerates the received symbol clock as a regenerated symbol clock having substantially no phase noise;

a buffer;

a buffer controller, wherein the buffer controller writes the received data stream into the buffer, wherein the buffer controller reads the received data stream from the buffer in response to the regenerated symbol clock, and wherein the buffer controller prevents overflow of the buffer; and, a modulator that re-modulates the received data stream read from the buffer for re-transmission as a re-transmitted digital television signal.

24. The re-transmitter of claim 23 wherein the buffer controller comprises a null packet subtractor and a null packet adder, wherein the null packet subtractor removes null packets from the received data stream so as to prevent overflow of the buffer, and wherein the null packet adder adds null packets to the received data stream read from the buffer so as to replace the null packets removed from the received data stream.

25. The re-transmitter of claim 24 wherein the narrowband loop filter has a bandwidth of about 1–50 Hz.

26. The re-transmitter of claim 24 wherein the narrowband loop filter has a bandwidth of about 0–5 Hz.

27. The re-transmitter of claim 24 wherein the frequency/phase locked loop comprises a phase/frequency detector that detects a phase/frequency error between the received symbol clock and the regenerated symbol clock.

28. The re-transmitter of claim 27 wherein the frequency/phase locked loop comprises:

a first divider that divides the received symbol clock and that applies the divided received symbol clock to the phase/frequency detector; and, a second divider that divides the regenerated symbol clock and that applies the divided regenerated symbol clock to the phase/frequency detector.

29. The re-transmitter of claim 28 wherein the frequency/phase locked loop further comprises a voltage controlled oscillator, and wherein the voltage controlled oscillator produces an oscillator output in response to an output from the narrowband loop filter.

30. The re-transmitter of claim 29 wherein the frequency/phase locked loop comprises a third divider that divides the oscillator output so as to produce the regenerated symbol clock.

31. The re-transmitter of claim 30 wherein the voltage controlled oscillator comprises a voltage controlled crystal oscillator.

32. The re-transmitter of claim 24 wherein the frequency/phase locked loop comprises a voltage controlled oscillator, and wherein the voltage controlled oscillator produce an oscillator output in response to an output of the narrowband loop filter.

33. The re-transmitter of claim 32 wherein the frequency/phase locked loop comprises a divider that divides the oscillator output to produce the regenerated symbol clock.

34. The re-transmitter of claim 32 wherein the voltage controlled oscillator comprises a voltage controlled crystal oscillator.

* * * * *